United States Patent
Iwata et al.

(10) Patent No.: US 11,077,605 B2
(45) Date of Patent: Aug. 3, 2021

(54) TUBE

(71) Applicant: FUJIFILM Corporation, Tokyo (JP)

(72) Inventors: Mitsuru Iwata, Minami-ashigara (JP); Kouji Tonohara, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 314 days.

(21) Appl. No.: 16/367,957

(22) Filed: Mar. 28, 2019

(65) Prior Publication Data
US 2019/0224907 A1    Jul. 25, 2019

Related U.S. Application Data

(63) Continuation of application No. PCT/JP2017/015555, filed on Apr. 18, 2017.

(30) Foreign Application Priority Data

Sep. 29, 2016 (JP) .............................. JP2016-191565

(51) Int. Cl.
*B29C 61/08* (2006.01)
*B29C 61/06* (2006.01)
(Continued)

(52) U.S. Cl.
CPC .......... *B29C 61/08* (2013.01); *B29C 61/0625* (2013.01); *B29C 71/00* (2013.01);
(Continued)

(58) Field of Classification Search
CPC .......... Y10T 428/1352; Y10T 428/139; Y10T 428/1393; Y10T 428/1397; F16L 11/12; F16L 11/121; F15D 1/06; F15D 1/065
See application file for complete search history.

(56) References Cited

U.S. PATENT DOCUMENTS

| | | | | |
|---|---|---|---|---|
| 3,643,702 A | * | 2/1972 | Kauder | F15D 1/065 138/121 |
| 3,687,169 A | * | 8/1972 | Reynard | F16L 11/10 138/134 |

(Continued)

FOREIGN PATENT DOCUMENTS

| | | |
|---|---|---|
| EP | 3178869 A1 | 6/2017 |
| JP | 6-116430 A | 4/1994 |

(Continued)

OTHER PUBLICATIONS

Japanese Notice of Reasons for Refusal dated Jul. 2, 2019, for corresponding Japanese Patent Application No. 2016-191565, with English translation.

(Continued)

*Primary Examiner* — Michael C Miggins
(74) *Attorney, Agent, or Firm* — Birch, Stewart, Kolasch & Birch, LLP

(57) ABSTRACT

The tube is stretchable. The tube is stretched by applying tension in a longitudinal direction. The tube returns to its short state by releasing the above-described tension applied in the longitudinal direction. A plurality of protrusions are formed on an inner surface of the tube. Each of the plurality of protrusions extends in a circumferential direction. The plurality of protrusions are arranged side by side in the longitudinal direction of the tube. A pitch of the protrusions is less than or equal to 1.5 μm.

3 Claims, 5 Drawing Sheets

(51) Int. Cl.

| | |
|---|---|
| *B29C 71/00* | (2006.01) |
| *B29D 23/00* | (2006.01) |
| *C08J 7/00* | (2006.01) |
| *F15D 1/06* | (2006.01) |
| *F16L 11/06* | (2006.01) |
| *B29K 83/00* | (2006.01) |
| *B29L 23/00* | (2006.01) |
| *B29C 55/00* | (2006.01) |
| *B29C 55/22* | (2006.01) |

(52) U.S. Cl.
CPC ............... *B29D 23/00* (2013.01); *C08J 7/00* (2013.01); *F15D 1/06* (2013.01); *F16L 11/06* (2013.01); *B29C 55/005* (2013.01); *B29C 55/22* (2013.01); *B29C 2791/001* (2013.01); *B29C 2791/004* (2013.01); *B29K 2083/00* (2013.01); *B29L 2023/003* (2013.01); *Y10T 428/1352* (2015.01)

(56) References Cited

U.S. PATENT DOCUMENTS

| | | | |
|---|---|---|---|
| 5,476,056 | A | 12/1995 | Tokunaga et al. |
| 9,151,415 | B2 | 10/2015 | Zazovsky et al. |
| 2004/0206410 | A1* | 10/2004 | Extrand ............... F15D 1/065 138/39 |
| 2006/0251859 | A1 | 11/2006 | D'Urso |
| 2007/0062594 | A1 | 3/2007 | Extrand |
| 2007/0259156 | A1 | 11/2007 | Kempers et al. |
| 2009/0217981 | A1 | 9/2009 | Extrand et al. |
| 2012/0302465 | A1 | 11/2012 | Elmouelhi et al. |
| 2017/0009327 | A1 | 1/2017 | Kogai et al. |
| 2017/0225436 | A1 | 8/2017 | Takahashi et al. |
| 2017/0368805 | A1 | 12/2017 | Tazaki et al. |

FOREIGN PATENT DOCUMENTS

| | | |
|---|---|---|
| JP | 7-17476 A | 1/1995 |
| JP | 9-39093 A | 2/1997 |
| JP | 2007-215803 A | 8/2007 |
| JP | 2009-509104 A | 3/2009 |
| JP | 2010-167929 A | 8/2010 |
| JP | 2012-255554 A | 12/2012 |
| JP | 2013-35197 A | 2/2013 |
| JP | 2014-516782 A | 7/2014 |
| JP | 2015-530527 A | 10/2015 |
| JP | 2016-37597 A | 3/2016 |
| WO | WO 99/24749 A1 | 5/1999 |
| WO | WO 2015/125789 A1 | 8/2015 |
| WO | WO 2016/104531 A1 | 6/2016 |

OTHER PUBLICATIONS

International Preliminary Report on Patentability and Written Opinion of the International Searching Authority (Forms PCT/IB/26, PCT/IB/373, and PCT/ISA/237) for International Application No. PCT/JP2017/015555, dated Apr. 11, 2019, with English translation.
International Search Report for International Application No. PCT/JP2017/015555, dated Aug. 1, 2017, with English translation.

* cited by examiner

TUBE

CROSS-REFERENCE TO RELATED APPLICATIONS

This application is a Continuation of PCT International Application No. PCT/JP2017/015555 filed on 18 Apr. 2017, which claims priority under 35 U.S.C § 119(a) to Japanese Patent Application No. 2016-191565 filed on 29 Sep. 2016. The above application is hereby expressly incorporated by reference, in its entirety, into the present application.

BACKGROUND OF THE INVENTION

1. Field of the Invention

The present invention relates to a tube.

2. Description of the Related Art

A tube made of polytetrafluoroethylene circulates as a tube having water repellency. The tube made of polytetrafluoroethylene is regarded as useful as an artificial biomaterial, but lacks flexibility. For example, JP2007-215803A discloses a bellows-like cylindrical body which is made of aliphatic polyester fibers having an average fiber diameter of 0.05 to 50 μm and has mountain portions and valley portions continuous in an axial direction, the bellows-like cylindrical body being used for artificial biomaterial. This cylindrical body has a thickness of 0.05 mm to 1 mm, an outer diameter of 0.5 mm to 50 mm, a gap of bellows of less than or equal to 2 mm, and a depth of bellows of 0.01 mm to 10 mm.

In addition, there is a technique for imparting water repellency to the surface of an object to be treated, by subjecting the object to be treated to a surface treatment. For example, JP1997-039093A (JP-H09-039093A) discloses a water repellent tube manufactured by bringing fluorine gas into contact with an outer surface of a tube made of a fluorine resin in a state where a holding device is placed inside the tube after roughening the outer surface of the tube through blasting.

It is known that water repellency is expressed or improved by utilizing a fine concavo-convex structure of μm level. In addition, JP2013-035197A discloses a substrate including a surface layer on which fine irregularities are formed with a size of a μm level.

SUMMARY OF THE INVENTION

The tube disclosed in JP2007-215803A has insufficient water repellency. Although a tube made of polytetrafluoroethylene has water repellency, winding is gradually loosened in a case where, for example, the tube is used in a state of being wound around another member or the like, or a fixed state is less likely to be held even if the tube is used in a state fixed to another member, for reasons that an outer surface is slippery and the like. The tube made of polytetrafluoroethylene is limited in applications and/or handling situations due to such difficulty in handling. In addition, JP1997-039093A (JP-H09-039093A) does not disclose the water repellency of an inner surface of the tube. In JP2013-035197A, one having a fine concavo-convex structure is a substrate and cannot be used for liquid transfer or the like.

Accordingly, an object of the present invention to provide a water repellent tube having excellent handling properties.

The present invention for solving the above-described problems is a stretchable tube in which a plurality of protrusions extending in a circumferential direction are formed side by side on an inner surface in a longitudinal direction, and a pitch of the protrusions is less than or equal to 1.5 μm.

It is preferable that heights of the protrusions are changeable depending on a tension applied in a longitudinal direction.

It is preferable that the present invention includes an outer circumferential portion made of polysiloxane, in which the protrusions are formed of a silicon compound having a larger number of oxygen atoms than polysiloxane.

It is preferable that the present invention includes an inner circumferential portion which has the protrusions and is formed of the silicon compound.

According to the present invention, the inner surface has water repellency and it is easy to handle the present invention.

DESCRIPTION OF THE PREFERRED EMBODIMENTS

Figure 1:
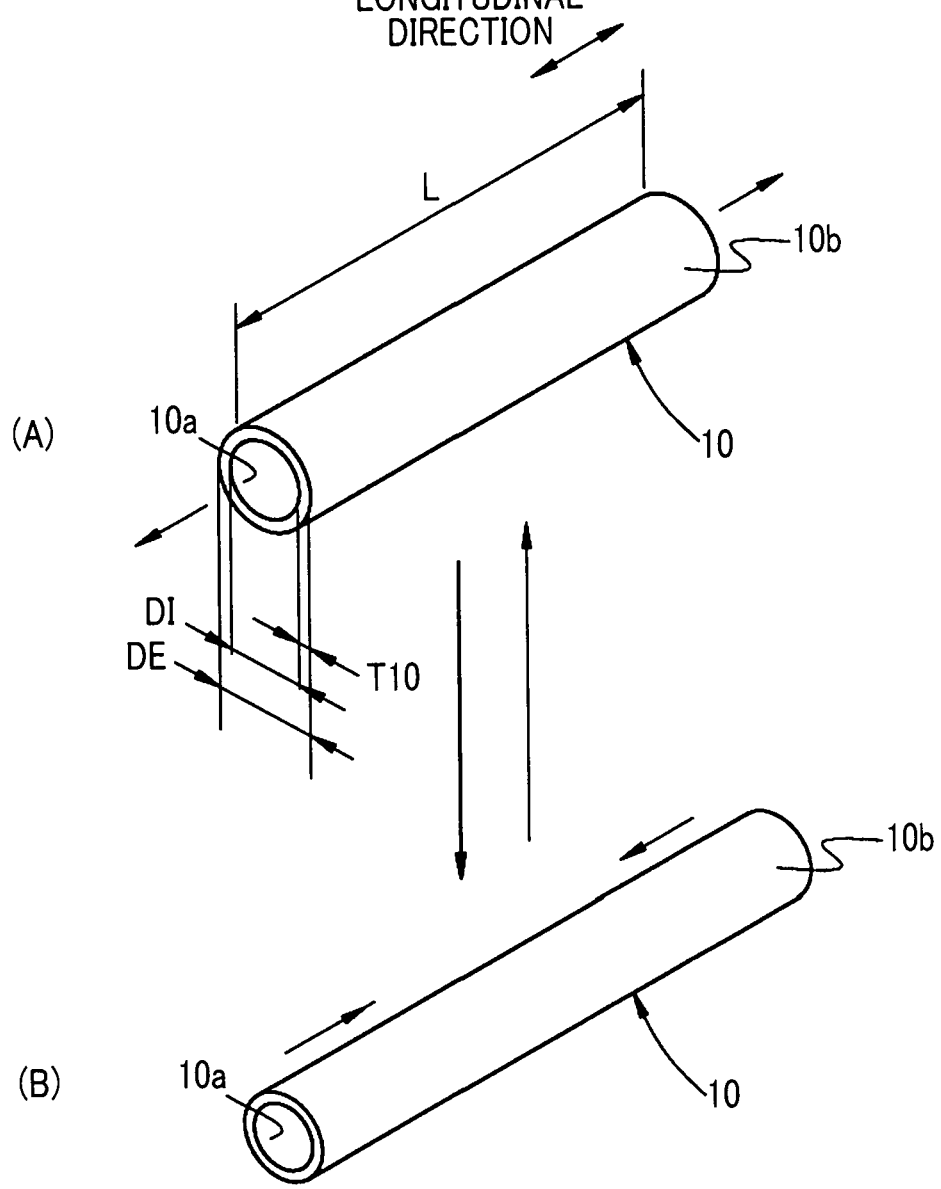
FIG. 1 is an explanatory view of a tube in which the present invention is exploited.

A tube 10 in which the present invention is exploited in FIG. 1 is provided for guiding water or an aqueous solution using water as a solvent to a target supply destination. The tube 10 is cylindrical in cross section. In FIG. 1, a length L of the tube 10 is drawn short relative to an outer diameter DE, an inner diameter DI, and a thickness T10 for convenience of explanation. The tube 10 has an outer diameter DE of 6 mm, an inner diameter DI of approximately 4 mm, a thickness T10 of approximately 1 mm, and a length L of 100 mm, for example. However, each of the dimensions of the tube is not limited thereto, and the outer diameter DE can be set to be within a range of 4 mm to 30 mm, the inner diameter DI can be set to be within a range of 2 mm to 20 mm, and the thickness T10 can be set to be within a range of 1 mm to 5 mm.

The tube 10 is made of a material having elasticity as will be described below, and its dimension in a longitudinal direction is changeable, that is, the tube 10 is stretchable. Specifically, the tube 10 enters a stretched state extending in a longitudinal direction using a tension applied in the longitudinal direction (refer to (B) of FIG. 1) and returns to its original length using a tension released (refer to (A) of FIG. 1). For this reason, the dimension of the tube 10 is changeable even in a radial direction, that is, the tube 10 is expandable and contractible. That is, in the stretched state, the outer diameter DE and the inner diameter DI are smaller than the state in which the tension is released (hereinafter, simply referred to as a "released state").

The tube 10 is stretchable by applying and releasing a tension in the longitudinal direction in this manner. Therefore, in a case where, for example, the tube is used by being wound around another member, device, or the like, winding work of the tube is facilitated and the winding is hardly loosened even in a state where the tube is left as it is after the winding. In addition, in a case where the tube 10 is fixed to another member or device using a fixing member such as a string, a binding band, or a wire, a stable fixed state is maintained. In this manner, it is easy to handle the tube 10.

Figure 2:
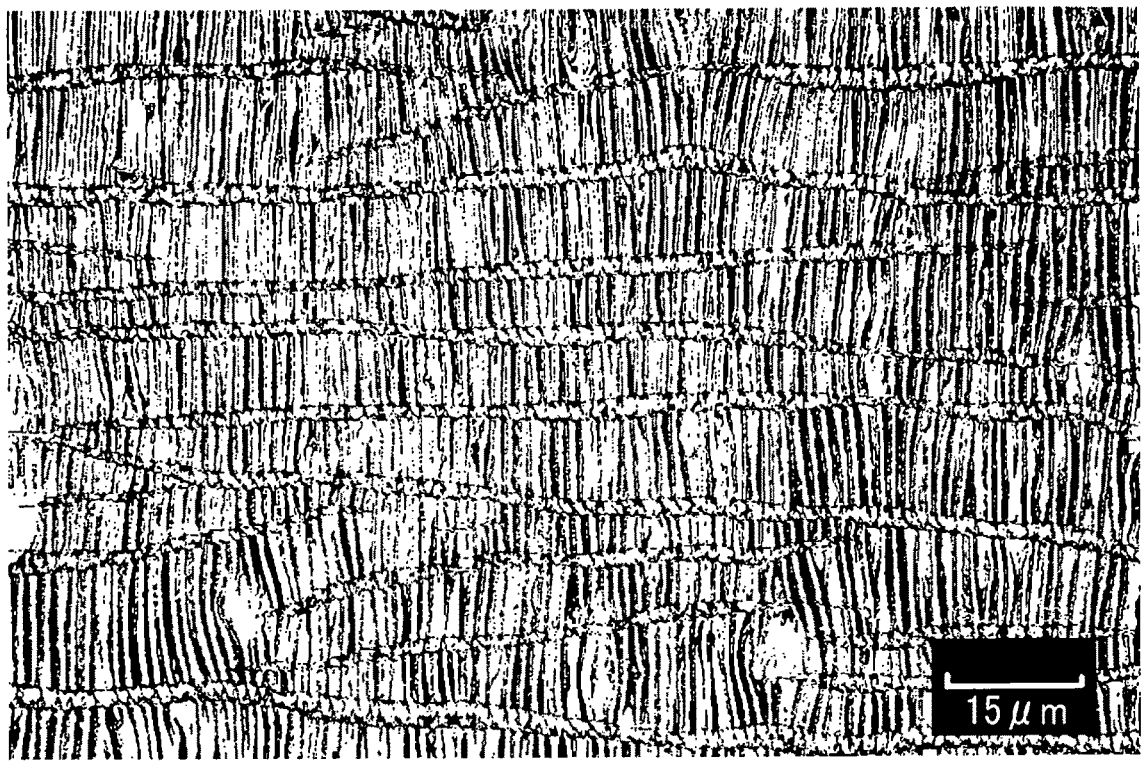
FIG. 2 is a confocal laser micrograph of an inner surface of the tube.

The inner surface of the tube 10 is denoted by a reference numeral 10a and the outer surface thereof is denoted by a reference numeral 10b. A plurality of protrusions extending in the circumferential direction are formed side by side on the inner surface 10a of the tube 10 in a longitudinal direction (refer to FIG. 2). Such protrusions are not formed on the outer surface 10b of the tube 10 of this example and are made flat. The horizontal direction in FIG. 2 is a longitudinal direction of the tube 10 and the vertical direction in FIG. 2 is a circumferential direction of the inner surface 10a of the tube 10.

Figure 3:
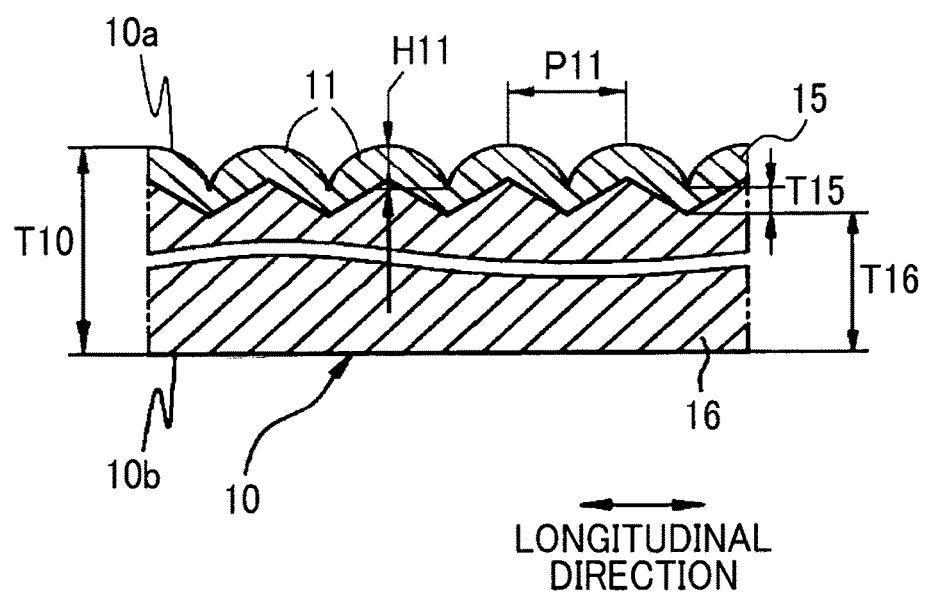
FIG. 3 is a schematic view of an end surface of a cross section along a longitudinal direction of the tube.
Figure 4:
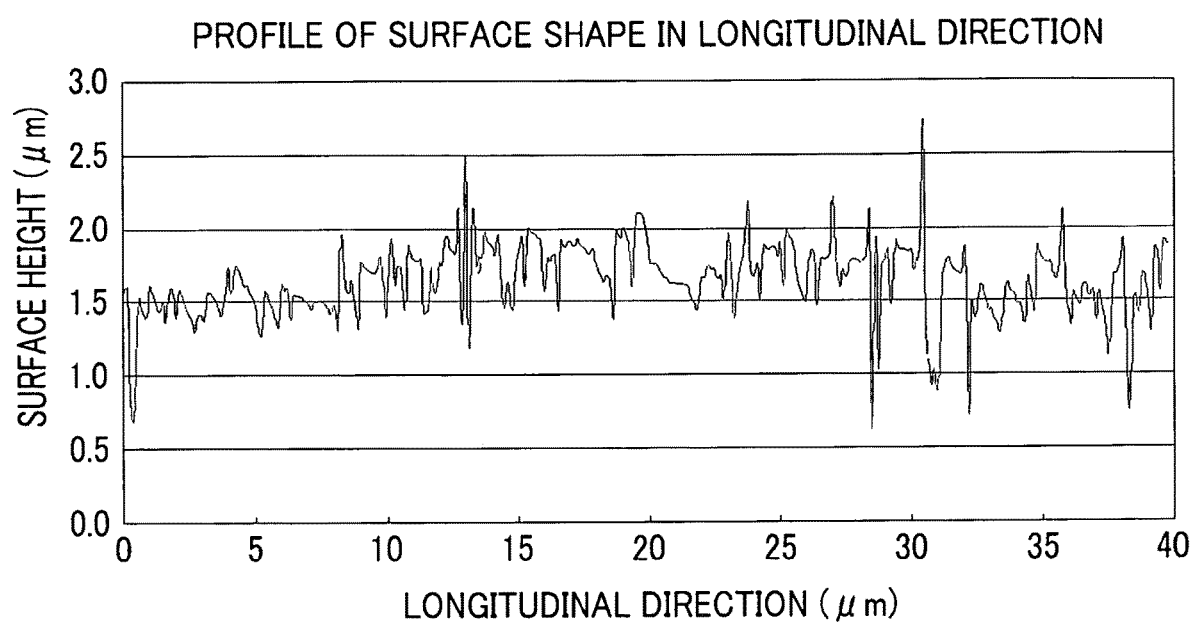
FIG. 4 is profile data of the inner surface of the tube.

As shown in FIG. 3, each of the above-described plurality of protrusions 11 extends in the circumferential direction (depth direction of the page of FIG. 3). The plurality of protrusions 11 are juxtaposed in the longitudinal direction of the tube 10 while being in contact with each other. A pitch P11 of the protrusions 11 is less than or equal to 1.5 µm (also refer to FIG. 4). That is, the pitch P11 is within the range of greater than 0 and less than or equal to 1.5 µm. As described above, the tube 10 in the released state is in a state in which the length L has returned short from the stretched state. Therefore, the above-described pitch P11 is a value in this released state in which the pitch has returned short. Since the plurality of protrusions 11 are formed on the inner surface 10a with such an extremely small pitch P11, the tube 10 shows water repellency on the inner surface 10a. In the tube 10, the contact angle of water on the inner surface 10a is 125°, whereas the contact angle of water on the outer surface 10b is 95°. Since the inner surface 10a of the tube 10 has water repellency, in a case where, for example, a water-based liquid such as an aqueous solution is sent, adhesion of the liquid to the inner surface 10a is suppressed. For this reason, a predetermined amount of liquid can be sent to an intended destination without waste, or the mixing amount a first liquid which has been previously sent and a second liquid which is to be sent later is suppressed to be small in a case of switching the sent liquid, and therefore, the amount of waste of the mixed liquid can be suppressed to be small and the switching is promptly performed. The pitch P11 is more preferably within a range of 1 µm to 3 µm, and still more preferably within a range of 1.5 µm to 2.0 µm. The "surface height" on a vertical axis in FIG. 4 represents a height of a measurement area when an arbitrary point on the inner surface 10a is set as a measurement start point and the height of the measurement start point is set to 1.5 µm as a reference position. The "longitudinal direction" on a horizontal axis represents a distance to the measurement area when the measurement start point is set as a reference position (0 µm).

As shown in FIG. 3, the pitch P11 is a distance between apex portions of the protrusions 11. In addition, the above-described contact angle of water is an advancing contact angle using distilled water. The contact angle can be obtained according to Japanese Industrial Standards JIS R3257, and in this embodiment, it is measured with a portable contact angle meter PCA-1 manufactured by Kyowa Interface Science Co., Ltd.

The height H11 of a protrusion 11 is preferably within a range of 1.0 µm to 3.0 µm in the released state. The height H11 of a protrusion 11 is more preferably within a range of 1.5 to 2.5 µm, and still more preferably within a range of 2.0 µm to 2.5 µm in the released state. As shown in FIG. 3, the height H11 is a height of an apex portion of a protrusion 11 with respect to a valley portion formed between protrusions 11.

Since the tube 10 is stretchable by applying a tension in the longitudinal direction as described above, the height H11 is changeable using the applied tension. That is, the larger the applied tension is, the smaller the height H11 becomes, and the smaller the tension is, the larger the height H11 becomes. Since the height H11 is changeable using the applied tension in this manner, it is possible to control the water repellency.

In the cross section along the longitudinal direction, the shape of the outline of a protrusion 11 is drawn in a circular arc shape in FIG. 3, but in some cases, it may be an elliptic arc shape, a parabola shape, and other curves with convex shapes on a hollow portion side of the tube 10. In some cases, there is a shape in which straight lines with different directions are connected to each other.

The tube 10 more preferably has a two-layer structure of an inner circumferential portion 15 forming the inner surface 10a and an outer circumferential portion 16 forming the outer surface 10b, and the tube in this example also has such a structure. In the cross section along the longitudinal direction, the boundary between the inner circumferential portion 15 and the outer circumferential portion 16 is drawn as a shape in which triangular mountain portions and valley portions are connected to each other in this example, but the present invention is not limited to this example. The outer circumferential portion 16 is preferably made of polysiloxane as a material having elasticity. Accordingly, the tube 10 becomes stretchable. In addition, since a thickness T16 of the outer circumferential portion 16 is larger than a thickness T15 of the inner circumferential portion 15, the tube 10 becomes more reliably stretchable.

The protrusions 11 are made of a silicon compound having a larger number of oxygen atoms per unit volume than the outer circumferential portion 16. This is because the protrusions 11 are made of silicon oxide (glass) obtained by oxidizing polysiloxane through a plasma treatment in a manufacturing method to be described below. Accordingly, the protrusions 11 become harder than the outer circumferential portion 16, and as a result, even if expansion and contraction of the tube 10 is repeated between the stretched state and the released state, destruction of the protrusions 11 is suppressed and the water repellency is more reliably maintained. The inner circumferential portion 15 has the plurality of protrusions 11, and the entire inner circumferential portion 15 is made of the aforementioned silicon compound having a larger number of oxygen atoms per unit volume than the outer circumferential portion 16.

The boundary between the inner circumferential portion 15 and the outer circumferential portion 16 can be confirmed by examining the number of oxygen atoms of the inner circumferential portion 15 and the outer circumferential portion 16. Specifically, it is as follows. First, the inner circumferential portion 15 is analyzed by X-ray photoelectron spectroscopy (XPS). Next, the surface layer of the inner circumferential portion 15 is removed by performing ion sputtering, and then, XPS analysis is performed again. By repeating the removal of the surface layer through ion sputtering and the XPS analysis in this manner, it is possible to obtain a compositional profile from the inner circumferential portion 15 to the outer circumferential portion 16. By comparing the photoelectron intensity belonging to oxygen based on the data, it can be seen that the composition of the inner circumferential portion 15 has a higher proportion of oxygen than the outer circumferential portion 16, and it is possible to confirm the boundary between the inner circumferential portion 15 and the outer circumferential portion 16. In some cases, the boundary between the inner circumferential portion 15 and the outer circumferential portion 16 cannot be visually recognized. However, even in the case where the boundary cannot be visually recognized, the above-described boundary is confirmed using the above-described method.

As shown in FIG. 3, the above-described thickness T15 is a distance from the boundary between the inner circumferential portion 15 and the outer circumferential portion 16 obtained through the above-described method to the surface of the inner circumferential portion 15. The thickness of the outer circumferential portion 16 is a distance from the valley portions formed between protrusions 11 to the outer surface 10b in the released state.

The tube 10 is manufactured by using a plasma cleaner (PDC 210) manufactured by YAMATO SCIENTIFIC CO., LTD., setting a tube material 31 in a stretched state on a processing stage of the plasma cleaner, and applying a voltage thereto. As the processing conditions, oxygen is used as plasma gas, the flow rate is set to 20 cm$^3$/min per minute 3.38×10$^{-3}$ Pa·m$^3$/sec or 3.33×10$^{-7}$ m$^3$/sec), the power is set to 500 W, and the plasma treatment time is set to 3 minutes. In the present embodiment, the tube material 31 made of polysiloxane as a material having elasticity is used, and the tube material 31 is stretchable. A tube material 31 having an outer diameter of 6 mm and a thickness of 1 mm is used in this example. In the present embodiment, the 100 mm tube material 31 is stretched to a length of 140 mm.

Figure 5A:
FIG. 5A is a confocal laser micrograph of the inner surface of the tube.
Figure 5B:
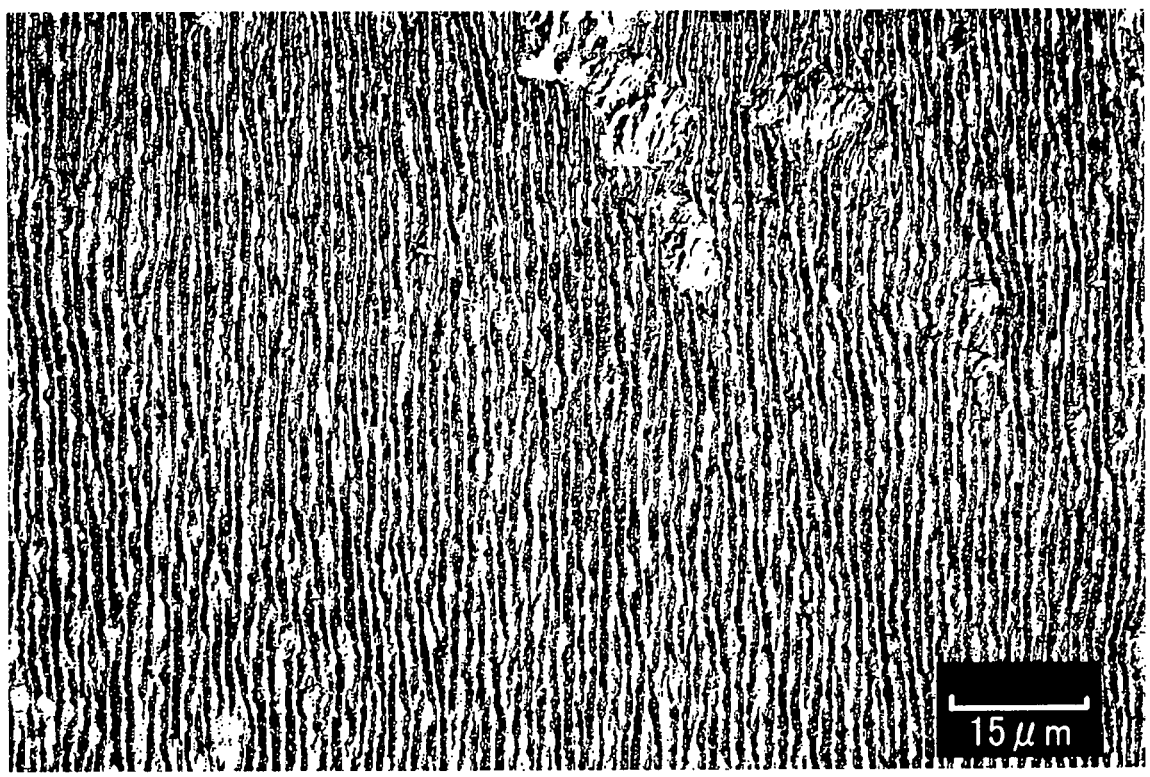
FIG. 5B is a confocal laser micrograph of the inner surface of the tube.

By changing the power and the plasma treatment time, it is possible to change the aspect of the inner surface 10a. For example, FIG. 5A is an image of the inner surface 10a of the tube 10 obtained in a case where the power is set to 500 W and the plasma treatment time is set to 1 minute. FIG. 5B is an image of the inner surface 10a of the tube 10 obtained in a case where the power is set to 300 W and the plasma treatment time is set to 1 minute.

Figure 6:
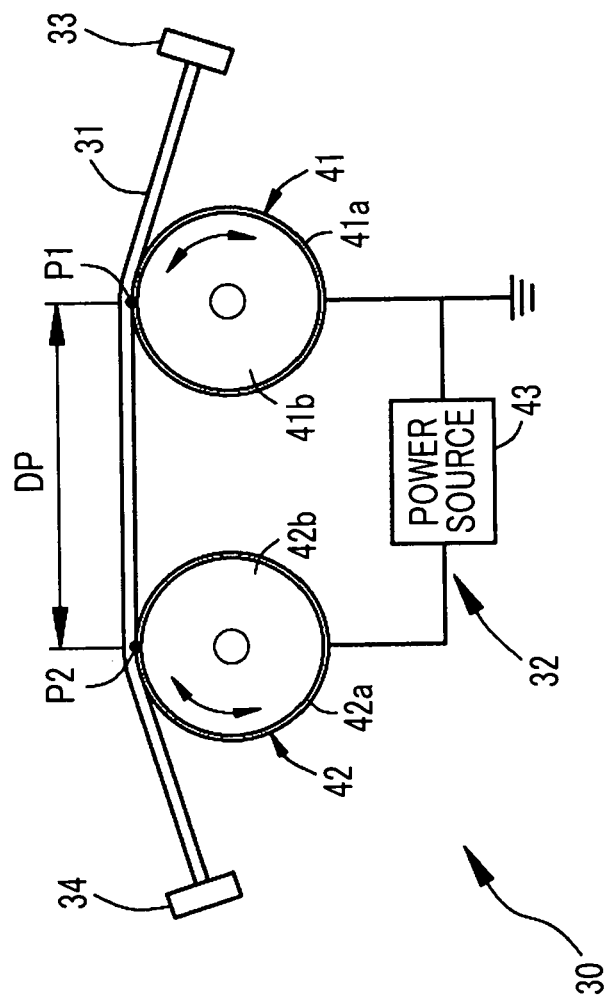
FIG. 6 is a schematic view of a tube manufacturing facility.

The manufacture of the tube 10 is also possible with other manufacturing facilities. For example, a tube manufacturing facility 30 shown in FIG. 6 includes a plasma generating device 32, and a pair of fixing portions 33, 34.

The plasma generating device 32 is for generating plasma in a hollow portion of the tube material 31, and includes a first electrode 41, a second electrode 42, and a power source 43. The first electrode 41 and the second electrode 42 have a configuration, for example, in which an electrode member 41a and an electrode member 42a made of a conductive material such as copper are provided on peripheral surfaces of a roller 41b and a roller 42b rotatable in the circumferential direction. Each of the electrode member 41a and the electrode member 42a is connected to the power source 43. The power source 43 applies a voltage between the electrode member 41a of the first electrode 41 and the electrode member 42a of the second electrode 42, thereby generating plasma. In the present embodiment, the power source 43 applies a voltage at a power of 200 W, and the application time of the voltage is 5 minutes.

By arranging the first electrode 41 and the second electrode 42 on an insulator apart from each other, the electrode member 41a and the electrode member 42a are electrically insulated from each other. However, the configuration of the first electrode 41 and the second electrode 42 is not limited to the above, and any configuration may be employed as long as the first electrode and the second electrode are arranged apart from each other and the electrode member 41a and the electrode member 42a are electrically insulated from each other. Any one of the first electrode 41 or the second electrode 42 is set as an earth electrode, and in FIG. 6, the first electrode 41 is set as an earth electrode.

The tube material 31 is stretched in a longitudinal direction (stretched step). The tube material 31 in the stretched state is brought into contact with each of the electrode member 41a and the electrode member 42a. By applying a voltage to the electrode member 41a and the electrode member 42a in a state where the stretched tube material 31 is brought into contact with the electrode member 41a and the electrode member 42a, plasma is generated in the hollow portion of the tube material 31. Accordingly, the inner surface side of the tube material 31 is subjected to a plasma treatment (plasma treatment step). The tube 10 is manufactured by performing the plasma treatment. However, no protrusions 11 are checked on the inner surface 10a during the stretched state which is the same state during the plasma treatment, and protrusions 11 are generated and checked by reducing the tension in the longitudinal direction. The plasma treatment in this example is an oxygen plasma treatment.

In the present embodiment, the 100 mm tube material 31 is stretched, for example, to a length of 140 mm. The fixing portion 33 is arranged on a side of the first electrode 41 opposite to the second electrode 42 and the fixing portion 34 is arranged on a side of the second electrode 42 opposite to the first electrode 41. The fixing portion 33 fixes one end of the stretched tube material 31, and the fixing portion 34 fixes the other end of the stretched tube material 31. Accordingly, the tube material 31 is disposed in contact with each of the electrode member 41a and the electrode member 42a in a state where the stretched state is maintained.

A contact position of the tube material 31 with the electrode member 41a is regarded as a first contact position P1 and a contact position with the electrode member 42a is regarded as a second contact position P2. It is preferable that a distance DP between the first contact position P1 and the second contact position P2 is within a range of less than or equal to 50 mm, that is, within a range of greater than 0 and less than or equal to 50 mm. In the case where the distance DP is less than or equal to 50 mm, plasma is more reliably generated in the hollow portion of the tube material 31 in the stretched state compared to a case where the distance is greater than 50 mm.

The voltage applied by the power source 43 is preferably an AC voltage. Accordingly, even if a tube material 31 having a low conductivity is used, it is possible to reliably generate plasma having a sufficient ionization density in the hollow portion.

The frequency of the AC voltage is preferably within a range of 8 kHz to 40 kHz, and is 10 kHz in the present embodiment. In a case where the frequency of the AC voltage is greater than or equal to 8 kHz, plasma with a higher ionization density is generated compared to a case where the frequency is less than or equal to 8 kHz. In a case where the frequency of the AC voltage is less than or equal to 40 kHz, the potential difference between the first contact position P1 and the second contact position P2 becomes larger than that of a case where the frequency is greater than 40 kHz. Therefore, even if the distance DP between the first contact position P1 and the second contact position P2 is large being, for example, 50 mm, plasma is more reliably generated in the hollow portion of the tube material 31.

In a case of manufacturing a long tube 10, for example, 2 m, the tube material 31 in the stretched state may be moved continuously or intermittently in the longitudinal direction to perform a plasma treatment on the tube material 31 which is being moved and/or stopped. In the case of manufacturing the long tube 10, after the plasma treatment, for example, the tube material may be wound around a winding core in a state in which the state is maintained in the stretched state which is the same state during the plasma treatment. In this case, if the stretching is released in unwinding from the winding core, the tube 10 in which the protrusions 11 are checked is obtained.

What is claimed is:

1. A stretchable tube,
    wherein a plurality of protrusions extending in a circumferential direction are formed side by side on an inner surface in a longitudinal direction, and
    wherein a pitch of the protrusions is less than or equal to 1.5 µm,
    wherein an outer circumferential portion made of polysiloxane,
    wherein the protrusions are formed of a silicon compound having a larger number of oxygen atoms than polysiloxane.
2. The tube according to claim 1,
    wherein heights of the protrusions are changeable depending on a tension applied in a longitudinal direction.
3. The tube according to claim 1, further comprising:
    an inner circumferential portion which has the protrusions and is formed of the silicon compound.

* * * * *